US007892084B2

(12) United States Patent
Yarbrough

(10) Patent No.: US 7,892,084 B2
(45) Date of Patent: Feb. 22, 2011

(54) SYSTEM AND METHOD FOR SIMULATING THE OUTCOME OF AN ELECTRONIC GAME AS A KENO GAME

(75) Inventor: Jon Yarbrough, Smyrna, TN (US)

(73) Assignee: Video Gaming Technologies, Roebuck, SC (US)

( * ) Notice: Subject to any disclaimer, the term of this patent is extended or adjusted under 35 U.S.C. 154(b) by 965 days.

(21) Appl. No.: 10/938,489

(22) Filed: Sep. 10, 2004

(65) Prior Publication Data

US 2005/0059466 A1 Mar. 17, 2005

Related U.S. Application Data

(60) Provisional application No. 60/502,753, filed on Sep. 12, 2003.

(51) Int. Cl.
*A63F 13/00* (2006.01)

(52) U.S. Cl. .............................. 463/19; 463/17; 463/18

(58) Field of Classification Search .................. 463/17, 463/18, 19
See application file for complete search history.

(56) References Cited

U.S. PATENT DOCUMENTS

| | | | | |
|---|---|---|---|---|
| 4,033,588 | A * | 7/1977 | Watts | 463/18 |
| 4,856,787 | A | 8/1989 | Itkis | |
| 5,393,057 | A * | 2/1995 | Marnell, II | 463/13 |
| 6,386,977 | B1 * | 5/2002 | Hole | 463/26 |
| 6,471,387 | B1 | 10/2002 | Henshaw et al. | |
| 6,537,150 | B1 | 3/2003 | Luciano et al. | |
| 7,329,183 | B2 * | 2/2008 | Michaelson et al. | 463/21 |
| 2002/0132661 | A1 * | 9/2002 | Lind et al. | 463/19 |

* cited by examiner

*Primary Examiner*—James S. McClellan
*Assistant Examiner*—Jeffrey Wong
(74) *Attorney, Agent, or Firm*—Howard & Howard Attorneys PLLC

(57) ABSTRACT

A game system and method plays an electronic game and simulates the outcome as a keno game. The game system allows a player to place a wager, plays the electronic game, and establishes an outcome of the electronic game. The outcome of the electronic game includes a payout according to a first pay table if a set of predetermined conditions has been achieved. The outcome of the game is simulated as a keno game. The outcome of the keno game is equivalent to the outcome of the electronic game.

47 Claims, 2 Drawing Sheets

SYSTEM AND METHOD FOR SIMULATING THE OUTCOME OF AN ELECTRONIC GAME AS A KENO GAME

This application claims priority to U.S. Provisional Patent Application Ser. No. 60/502,753, filed Sep. 12, 2003.

FIELD OF THE INVENTION

The present invention relates generally to electronic games, and more particularly, to an electronic game whose results are presented as a simulated keno game.

BACKGROUND OF THE INVENTION

In some jurisdictions, wagering is permitted on certain types of games, e.g., Bingo, lotteries, pull-tabs, is allowed. The games may be electronic.

In one scenario, an electronic game, such as Bingo, is provided in which players compete with and against each other. A minimum of two players is needed. Each player uses a player terminal which is inter-linked, e.g., via an Ethernet network, to a central server. To initiate the play of the game, a player inserts credits or coins, or currency into the player terminal. The coins or currency may be converted into credits. The number of credits are added to a credit meter and displayed on a display screen.

If the game being player is Bingo, the player selects the level of play by pressing a "bet" button to set the wager amount for a bingo card. The player may then initiate the bingo game by pressing a "play" button.

The server, after determining that enough players have entered the game, randomly determines a string of numbers and transmits the numbers to the player terminals. These are daubed, automatically or by the player, onto their card(s).

Each game has a defined game-ending pattern. As soon, as the string of numbers results in the game ending pattern for one of the players on one of the cards, the bingo game is over and no additional numbers are transmitted. The player with the game-ending or winning pattern is awarded a payout, in terms of credits, according to a pay table which may be traded in for cash.

However, in such jurisdictions, wagers on other types of games, such as keno, may not be permitted. Those persons desiring to wager on keno games may not be interested in playing Bingo.

The present invention is aimed at one or more of the problems identified above.

SUMMARY OF THE INVENTION

In a first aspect of the present invention, a game system for playing an electronic game is provided. The game system includes a player game device and a game controller. The player game device allowing a player to place a wager. The game controller is coupled to the player game device for playing the electronic game and establishes an outcome of the electronic game. The outcome of the electronic game includes a payout according to a pay table if a set of predetermined winning conditions has been achieved. The game controller further simulates a keno game on the player device. The outcome of the keno game is equivalent to the outcome of the electronic game.

In a second aspect of the present invention, a method for playing an electronic game is provided. The method includes the steps of allowing a player to place a wager, playing the electronic game and establishing an outcome of the electronic game. The outcome of the electronic game includes a payout according to a pay table if a predetermined set of conditions has been achieved. The method also includes the step of simulating an electronic keno game. The outcome of the keno game is equivalent to the outcome of the electronic game.

In a third aspect of the present invention, a game system for playing an electronic bingo game is provided. The game system includes a player game device and a game controller. The player game device allows a player to place a wager and purchase an electronic bingo card. The electronic bingo card has a grid containing a set of numbers and has an associated winning pattern. The game controller is coupled to the player game device and establishes a set of randomly chosen numbers, compares the set of randomly chosen numbers with the associated winning pattern and establishes an outcome of the electronic bingo game. The outcome of the electronic bingo game includes a payout according to a first pay table if the winning pattern has been achieved. The game controller simulates a keno game on the player device. The outcome of the keno game is equivalent to the outcome of the electronic bingo game.

In a fourth aspect of the present invention, a method for playing an electronic bingo game is provided. The method includes the steps allowing a player to place a wager and purchase an electronic bingo card, establishing a set of randomly chosen numbers, comparing the set of randomly chosen numbers with the associated winning pattern, and establishing an outcome of the electronic bingo game. The electronic bingo card has a grid containing a set of numbers and an associated winning pattern. The outcome of the electronic bingo game includes a payout according to a first pay table if the winning pattern has been achieved. The method also includes the step of simulating an electronic keno game. The outcome of the keno game is equivalent to the outcome of the electronic bingo game.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 1:
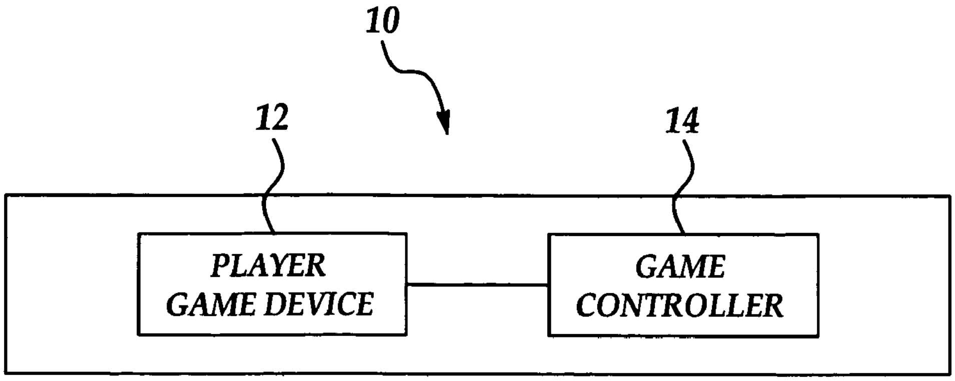
FIG. 1 is block diagram of a game system for simulating the outcome of an electronic bingo game as a keno game, according to an embodiment of the present invention.

With reference to the drawings and in operation, the present invention provides a game system 10 for playing an electronic game. With particular reference to FIG. 1, the game system 10 includes a player game device 12 and a game controller 14. The player game device 12 allows a player to place a wager. The game controller 14 is coupled to the player game device 12 for playing the electronic game and establishes an outcome of the electronic game. The outcome of the electronic game includes a payout according to a pay table if a set of predetermined winning conditions has been achieved. The game controller 12 further simulates a keno game on the player device 12. The outcome of the keno game is equivalent to the outcome of the electronic game.

The electronic game may be any type of game which has an outcome and provides a payout. For example, the types of electronic games may include, but is not limited to, bingo and similar games, slot machines, casino games, card games, dog or horse racing, lotteries, and all other forms of gaming. For purposes of illustration only, the present invention is described below in terms of bingo, but the present invention is not limited to such.

Figure 2:
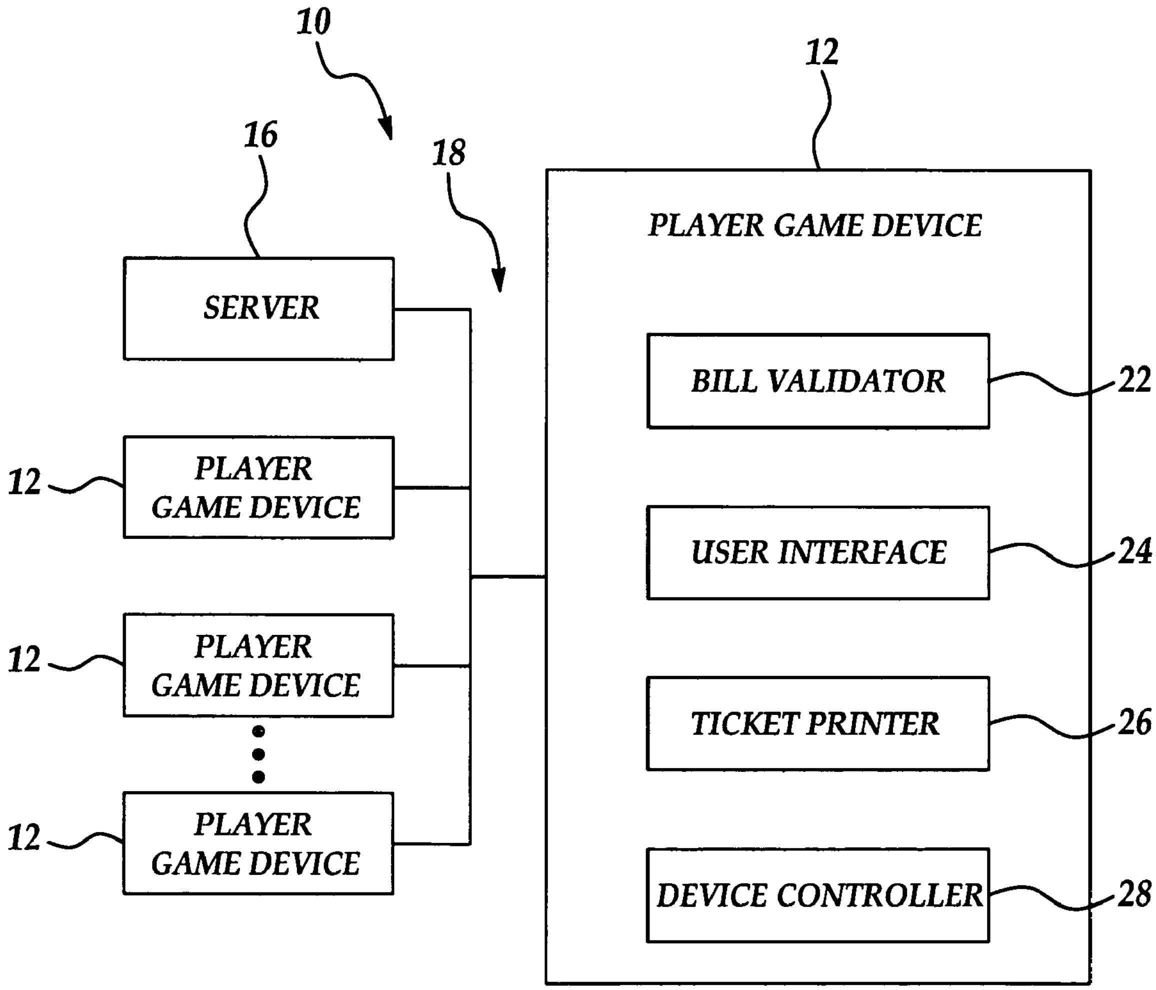
FIG. 2 is a block diagram of a game system for simulating the outcome of an electronic bingo game as a keno game, according to another embodiment of the present invention.

With particular reference to FIG. 2 in one embodiment, a plurality of player game devices 12 connected to a server 16 are provided. The game controller 14 is implemented by the server 16. Each player device 12 may be connected to the server 16 by an Ethernet link 18.

The player game device 12 allows a player to place a wager and purchase an electronic bingo card 20. In one embodiment, the electronic bingo card is a 5×5 grid with the columns labeled B, I, N, G, and O, respectively. The center cell may be a "free" cell.

Each Bingo game has at least one winning pattern. A winning pattern is a sub-set of the cells of the grid which trigger an award or payout. The amount of the award or payout may dependent upon the wager made by the player and a predetermined pay table. In one embodiment, each Bingo game has a game-ending pattern which signifies the end of the game. For example, the game-ending pattern may include all of the cells of the electronic bingo card 20. The payout associated with the game-ending pattern is paid to the first player who achieves the game-ending pattern.

One or more interim winning patterns may also be included. The interim winning patterns may provide a payout, without ending the game, as a function of the player's wager and a second pay table. The interim winning patterns may have other conditions associated therewith. For example, in order for a payout to occur, the interim winning pattern must be achieved within a predetermined number of the randomly drawn numbers.

The game controller 14 is coupled to the player game device 12 and establishes a set of chosen numbers. In one embodiment, the set of chosen numbers are randomly chosen using a random number generator (not shown).

In one embodiment, there are a predetermined number of numbers in the set of chosen numbers, e.g., seventy-five.

In one embodiment, the predetermined number of numbers in the set of chosen numbers are established within a predetermined period of time, e.g., approximately 10 seconds.

The game controller 14 compares the set of randomly chosen numbers with the associated winning pattern and establishing an outcome of the electronic bingo game. The outcome of the electronic bingo game may include a payout according to a first pay table if the winning pattern has been achieved. The winning pattern may be the game ending pattern and/or one or more interim winning patterns. In other words, the outcome of the electronic bingo game may include a payout to the player if the game ending pattern is achieved and, alternatively or in addition, may include a second payout if an interim winning pattern is achieved.

The outcome of the electronic bingo game may be a "loss" if no winning pattern is achieved after all numbers have been selected or another player achieves the game winning pattern.

After the Bingo game has been played, the game controller 14 simulates a keno game on the player game device 12. The outcome of the keno game is the equivalent to the outcome of the electronic bingo game.

In one version of standard Keno, i.e., non-simulated, one or more players are playing against the house or casino. Each player has at least one Keno card which has 80 different numbers printer thereon. The player decides how many numbers of the numbers to pick (usually one of a predetermined number of numbers) up to a predetermined maximum, e.g., 15 numbers. During play of the Keno game, a set of winning numbers are chosen or drawn. The player is awarded a payout as a function of the number of the winning numbers which match their chosen numbers their wager, their wager, and a pay table. The pay table is one of a predetermined number of pay tables and is chosen based on the number of numbers chosen by the player. For example, the player may chose to play Pick 2, Pick 3, Pick 4, Pick 5, Pick 6, Pick 7, Pick 8, Pick 9, or Pick 10. Each has an associated pay table. Each pay table has an associated payout for each number of possible matches. For example, if the player chooses to play Pick 2, the player may select a two of the Keno numbers. The pay table will have a pay out (generally a factor which is multiplied by the player's wager) for zero matches, for one match and for two matches, e.g., 0, 10, and 50, respectively.

In the simulated keno game (see below), the pay table is dependent upon the number of numbers chosen by the player as well as the outcome of the electronic bingo game (since there may be different combinations of "wins" or winning patterns on each bingo card). Further, the winning numbers are selected by the game controller 14 such that the outcome of the simulated keno game is the equivalent of the electronic bingo game.

With specific reference to FIG. 2, the player game device 12 may be a stand-alone device, console or upright machine which is connected to the server 16 via, for example, an Ethernet link. In one embodiment, the player game device 12 includes a bill validator 22, a user interface 24, a ticket printer 26, and a device controller 28.

To initiate the play of the game, a player inserts credits or coins, or currency into the player game device 12. Coins may be inserted into a coin acceptor (not shown) if provided. Currency may be inserted into a bill validator 22. The coins or currency may be converted into credits. Alternatively or in addition, the player may insert a ticket or card having a number of credits represented thereon or may insert a player tracking card to access credits in a player account.

The user interface device 24 allows interaction between the player game device 12, the game controller 14, and the player. The user interface device 24 includes a display screen and a plurality of buttons (see FIGS. 3 and 4). In one embodiment, the user interface device 24 is a touch-screen device 30 (see FIGS. 3 and 4). User input buttons are implemented by the touch screen 30. Alternatively, or in addition, other input buttons may be implemented by mechanical push-buttons. The number of credits or currency input by the player are added to a credit meter and displayed on the display screen 30 at 32.

The user interface device 24 also provides a menu button 33. The player may access additional functions via the menu button 33. For example, the menu button 33 provides the player with an opportunity, through a menu item, to cash out. In one embodiment, in response to the player choosing to cash out, a ticket representing the remaining credits on the credit meter 32 is printed by the ticket printer 26. The printed ticket may be redeemed for cash at a kiosk or cashier station.

The bill validator 22, the user interface device 24, and the ticket printer 26 are coupled to and controlled by the device controller 28. The device controller 28 also manages communications to and between the server 16.

Figure 3:
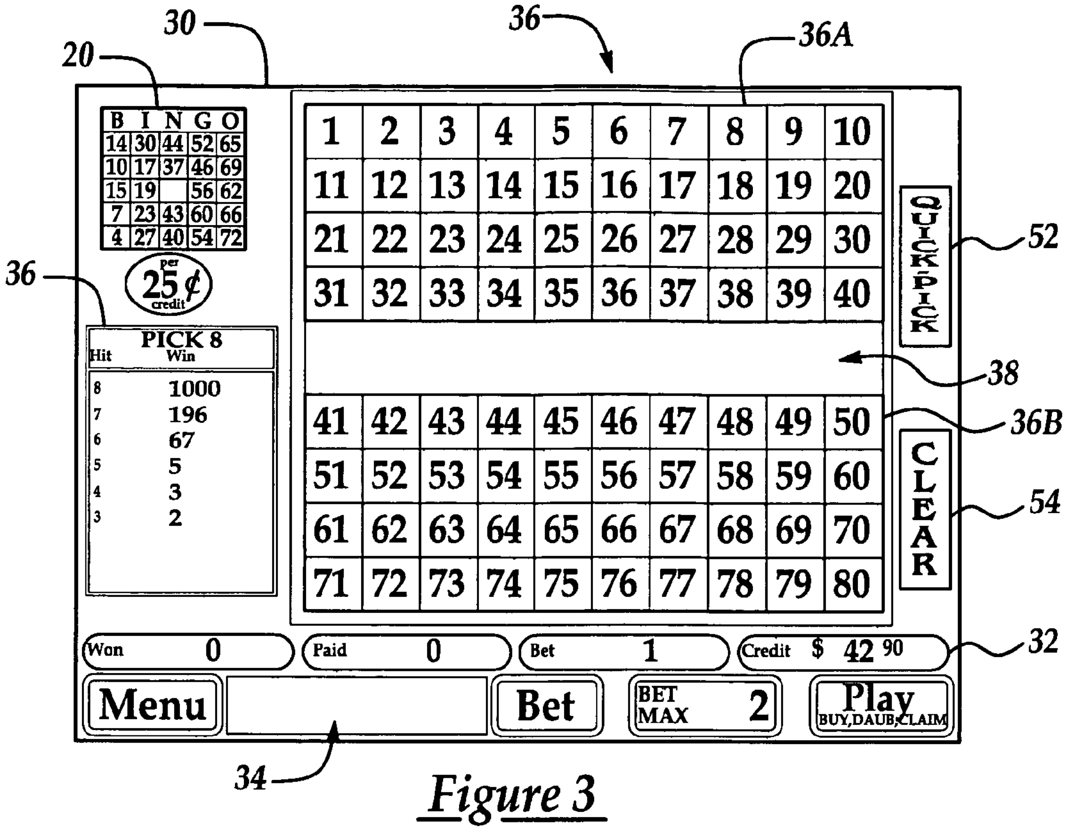
FIG. 3 is a first illustrative screenshot for use in a game system for simulating the outcome of an electronic bingo game as a keno game, according to another embodiment of the present invention; and, FIG. 4 is a second illustrative screenshot for use in a game system for simulating the outcome of an electronic bingo game as a keno game.
Figure 4:
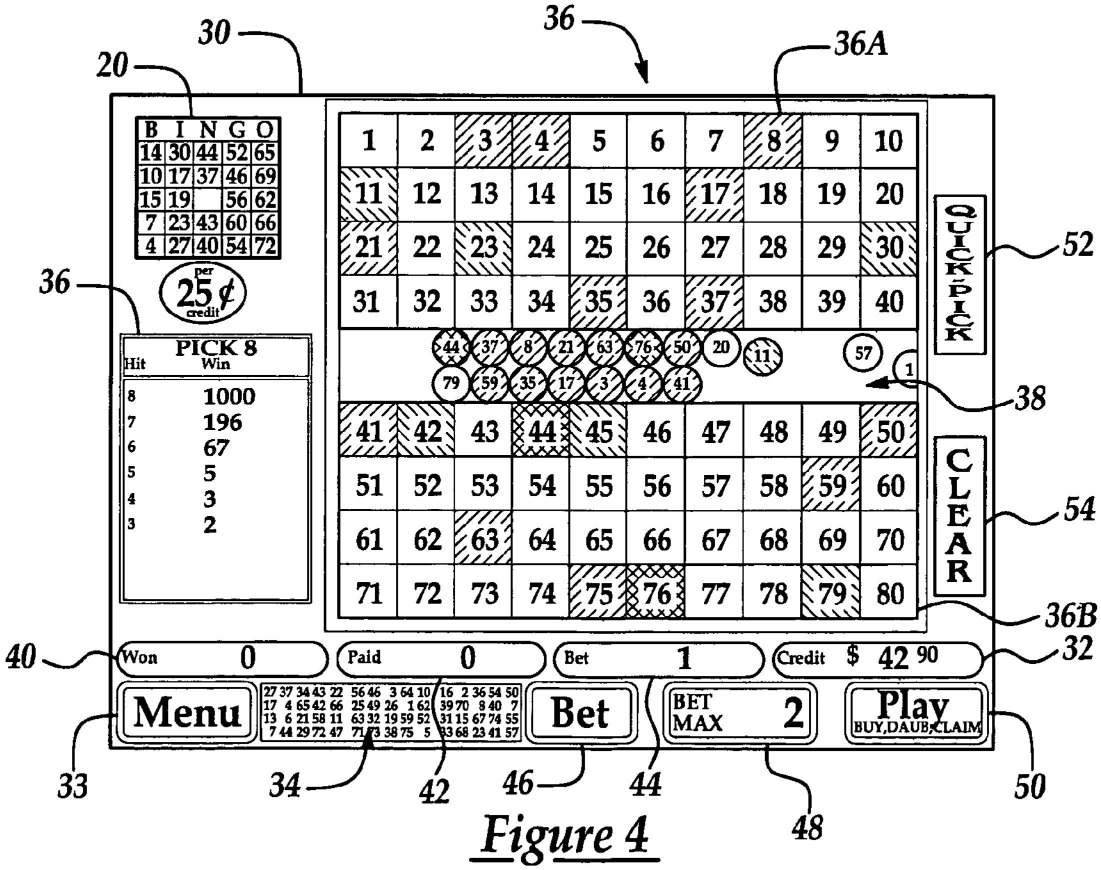

As shown in FIGS. 3 and 4, the electronic bingo card 20 is represented on the touchscreen display 30. Prior to the commencement of the games, the cells on the game card are shown in a neutral color, e.g., white. As the set of chosen numbers are chosen, the numbers are displayed in a Bingo number display area 34. If the chosen number appears on the player's bingo card, then that number is highlighted, shown in another color, such as red or pink. The electronic Bingo card 20 may also highlight any winning pattern, e.g., by showing the numbers in the cells of the interim winning pattern in another color.

In another aspect of the present invention, the player game device 12 allows the player to purchase additional electronic bingo cards 20, prior to any player achieving the game ending pattern or the last number in the set of chosen numbers having been chosen.

The touchscreen display 30 further includes a keno number display area 36, a ball display area 38, a won meter 40, a paid meter 42, and a bet meter 44. The touchscreen display 30 also includes a quickpick button 52 and a clear button 54.

The quickpick button 52 and the clear button 54 are used prior to initialization of the electronic Bingo game. In one embodiment, the game controller, prior to initialization of the electronic bingo game, allows the player to establish a number of numbers to be selected by the player, i.e. the player chooses how many numbers the player is going to pick and to select the numbers. Then the player may either select the numbers by touching the number in the keno number display area 36 or allow the game controller 14 to automatically select the numbers by selecting the quickpick button 52. The player may clear the selected numbers by selecting the clear button 54. The selected numbers may be highlighted in another color.

The keno numbers (shown as 1-80) are shown in the keno number display area 36. In the illustrated embodiment, the keno number display area 36 includes a first portion 36A and a second portion 36B separated by the ball display area 38. After the electronic Bingo game, the game controller selects a plurality of balls, each ball having an associated number. The numbers associated with the plurality of balls are chosen to achieve the payout conforming to the outcome of the electronic bingo game. The winning numbers (represented by balls) are displayed in the ball display area 38. Any matches may be highlighted in the keno number display area 36 in a different color. FIG. 4 shows the display 30 during the simulated keno game. The keno number chosen by the player (indicated by upper left to lower right shading) which have not been matched by the drawn winning numbers are 23, 30 42, 45, and 79. The winning keno numbers which are not matched by the player chosen numbers are shown on the keno balls in the keno ball display area 38 which are not shaded and are indicated in the keno number display area 36 by upper-right to lower-left cross shading. Matched numbers are cross-hatched in the keno number display area 38.

The won meter 40 shows the number of credits or amount won by the player in the current session. The paid meter 42 shows the amount paid to the player in the current session. The bet meter 44 shows the current bet made by the player. The touch-screen display 30 further includes a bet button 46, a bet max button 48, and a play button 50. The bet button 46, bet max button 48, and play button 50 are used by the player to make a wager and control the electronic bingo game in a known manner.

In another aspect of the present invention, a method for playing an electronic bingo game is provided. The method includes the steps allowing a player to place a wager and purchase an electronic bingo card, establishing a set of randomly chosen numbers, comparing the set of randomly chosen numbers with the associated winning pattern, and establishing an outcome of the electronic bingo game. The electronic bingo card has a grid containing a set of numbers and an associated winning pattern. The outcome of the electronic bingo game includes a payout according to a pay table if the winning pattern has been achieved. The method also includes the step of simulating an electronic keno game. The outcome of the keno game is equivalent to the outcome of the electronic bingo game.

INDUSTRIAL APPLICABILITY

With reference to the drawings, in the illustrated embodiment the present invention provides an electronic bingo game presented to the player as a Keno game. The electronic bingo game is completed before the Keno numbers are drawn.

The game controller 14 controls the bet and play buttons and handles bet placement and decisions to play. After the bingo game has completed, the game controller 14 simulates a keno game and ensures that, regardless of the player's choice of numerical values, the result of the Keno game being presented reflects the result of the underlying bingo game.

There is no possibility for error or player strategy in the Keno game to alter the results of the game since the game controller 14 not only determines the results of the game, it also manages the meters and the credits. Additionally, in order to present the bingo results as a Keno game, the choice of the pay table is controlled.

The simulated game of Keno consists of drawing 20 numbered balls from a bin of 80 total balls and matching them to a set of numbers that was selected by the player. The player picks between two and ten numbers on the display 30 that displays all 80 possible numbers. The winnings are determined by matching the player's selection with the 20 numbers drawn and counting the number of matching pairs of identical numbers. The prize awarded to the player is selected from a pay table that is statistically calculated based on the number of hits. There is a separate pay table statistically calculated for each quantity of numbers between two and ten that the player has selected.

Each Keno game is divided into several sub-games, each based on the quantity of numbers that the player has selected from the Keno board. The subject invention allows the player to select from two to ten numbers which result in a maximum of nine possible games, each having its own pay table. For every bingo card played, the results are presented as a Keno game using a specific Keno paytable.

The underlying bingo game utilizes different bingo card patterns for different pay table wins. A prize is awarded to the player when the player obtains a winning pattern within a specified bingo card. The winning bingo pattern correlates to a subsequent Keno win presented to the player as governed by the Keno paytable. The bingo patterns are correlated with each Keno paytable frequency that has the most closely related statistical similarity to the bingo pattern.

When the player selects the Keno numbers, the player also selects which bingo sub-game to play because of the statistically similar matching of games that occurs. There are nine possible sub-games that can be selected. Accordingly, these are Pick 2, Pick 3, Pick 4, Pick 5, Pick 6, Pick 7, Pick 8, Pick 9, and Pick 10 numbers, respectively. Within each of these sub-games there are two possible results that can occur, namely, matching or not-matching a number. Therefore, within the nine possible games that can be selected, there are 63 possible scenarios that can result.

When the play button is pushed, the bingo card is selected, purchased, and tested for winning patterns. Keno to bingo completes an analysis of the bingo card for winning patterns and selects a corresponding Keno paytable. If no pattern is found, the non-winner entry is selected. The gaming controller 14 examines the player's Keno game board for numbers the player has picked and chooses the appropriate Keno balls to draw. The balls are drawn, the game board is marked, and the appropriate prize is awarded.

Obviously, many modifications and variations of the present invention are possible in light of the above teachings. The invention may be practiced otherwise than as specifically described within the scope of the appended claims.

What is claimed is:

1. A game system for playing an electronic game, comprising:

a player game device for allowing a player to place a wager; and, a game controller coupled to the player game device for playing the electronic game and establishing an outcome of the electronic game, the outcome of the electronic game including a payout according to a main pay table if a set of predetermined winning conditions has been achieved, the game controller further for simulating a keno game on the player device, the game controller, in simulating the keno game, allows a player to choose how many numbers are to be played in the simulated keno game and allows the player to select the chosen number of numbers, the game controller for selecting a simulation pay table for the simulated keno game from a set of simulation pay tables as a function of the player chosen number of numbers and the outcome of the electronic game, the game controller for selecting a set of keno winning numbers such that the selected simulation pay table of the simulated keno game establishes a simulated payout as a function of a number of matches between the keno winning numbers and the numbers selected by the player, the simulated payout of the keno game being equivalent to the payout of the electronic game.

2. A game system, as set forth in claim 1, wherein the game system include a plurality of player game devices, the game controller being implemented in a server, each player game device being connected to the server.

3. A game system, as set forth in claim 2, the plurality of player game devices allowing a plurality of players to compete with and against each other in the electronic game.

4. A game system, as set forth in claim 1, the player game device including a bill validator for accepting currency and responsively providing a number of credits which may be played by the player.

5. A game system, as set forth in claim 1, the player game device having a user interface device for allowing interaction between the player game device and game controller and the player.

6. A game system, as set forth in claim 1, the player game device including a ticket printer for printing a redeemable ticket for any remaining credits on the player game device.

7. A game system, as set forth in claim 1, the player game device including a bill validator, a user interface device, a ticket printer all coupled to and controller by a device controller.

8. A game system, as set forth in claim 7, the user interface device including a touch-screen display.

9. A game system, as set forth in claim 1, wherein the game controller, during the simulated keno game, selects a plurality of balls, each ball having an associated number, the numbers associated with the plurality of balls chosen to achieve the payout conforming to the outcome of the electronic game.

10. A game system, as set forth in claim 9, wherein the simulation pay table of the simulated keno game has a plurality of possible payouts, each payout associated with a possible outcome of the electronic game.

11. A game system, as set forth in claim 10, wherein a first payout of the simulation pay table is a loss of the player and corresponds to zero matches between the numbers chosen by the player and the balls selected by the game controller.

12. A game system, as set forth in claim 11, wherein each simulation pay table of the simulated keno game has an associated number of matches between the numbers selected by the player and the numbers associated with the balls selected by the game controller.

13. A method for playing an electronic game, including the steps of:

allowing a player to place a wager;

playing the electronic game and establishing an outcome of the electronic game, the outcome of the electronic game including a payout according to a main pay table if a predetermined set of conditions has been achieved; and, simulating an electronic keno game by allowing the player to choose how many numbers are to be played in the simulated keno game and allowing the player to select the chosen number of numbers;

selecting a simulation pay table for the simulated keno game from a set of simulation pay tables as a function of the player chosen number of numbers and the outcome of the electronic game;

selecting a set of keno winning numbers such that the selected simulation pay table of the simulated keno game establishes a simulated payout as a function of a number of matches between the keno winning numbers and the numbers selected by the player, the simulated payout of the keno game being equivalent to the payout of the electronic game.

14. A method, as set forth in claim 13, including the step of allowing a plurality of players to compete with and against each other in the electronic game.

15. A method, as set forth in claim 13, wherein the simulation pay table of the simulated keno game is established as a function of the number of numbers chosen by the player.

16. A method, as set forth in claim 13, including the step of, during the simulated keno game, selects a plurality of balls, each ball having an associated number, the numbers associated with the plurality of balls chosen to achieve the payout conforming to the outcome of the electronic bingo game.

17. A method, as set forth in claim 16, wherein the selected simulation pay table of the simulated keno game has a plurality of possible payouts, each payout associated with a possible outcome of the electronic game.

18. A method, as set forth in claim 17, wherein a first payout of the selected simulation pay table is a loss of the player and corresponds to zero matches between the numbers chosen by the player and the numbers associated with the balls selected by the game controller.

19. A method, as set forth in claim 18, wherein each simulation pay table of the simulated keno game has an associated number of matches between the numbers selected by the player and the numbers associated with the balls selected by the game controller.

20. A game system for playing an electronic bingo game, said game comprising:

a player game device for allowing a player to place a wager and purchase an electronic bingo card, the electronic bingo card have a grid containing a set of numbers and an associated winning pattern; and, a game controller coupled to the player game device for establishing a set of randomly chosen numbers, comparing the set of randomly chosen numbers with the associated winning pattern and establishing an outcome of the electronic bingo game, the outcome of the electronic bingo game including a payout according to a first pay table if the winning pattern has been achieved, the game controller, in simulating the keno game, allows the player to choose how many numbers are to be played to be played in the simulated keno game and allows the player to select the chosen number of numbers, the game controller for selecting a second pay table for the simulated keno game from a set of pay tables as a function of the player chosen number of numbers and the outcome of the electronic bingo game, the game controller for selecting a set of keno winning numbers such that the selected second pay table of the simulated keno game establishes a simulated payout as a function of a number of matches between the keno winning numbers and the numbers established by the game controller, the simulated payout of the keno game equivalent to the payout of the electronic bingo game.

21. A game system, as set forth in claim 20, wherein the game system include a plurality of player game devices, the game controller being implemented in a server, each player game device being connected to the server.

22. A game system, as set forth in claim 21, the plurality of player game devices allowing a plurality of players to compete with and against each other in the electronic bingo game.

23. A game system, as set forth in claim 20, wherein the associated winning pattern is a game ending pattern, the game controller awarding a payout under the first pay table only to the first player whose electronic bingo card has the game ending pattern.

24. A game system, as set forth in claim 20, wherein the set of randomly chosen numbers includes a predetermined number of numbers.

25. A game system, as set forth in claim 20, including at least one interim pattern, the at least one interim pattern resulting in a payout according to a second pay table.

26. A game system, as set forth in claim 20, the player game device including a bill validator for accepting currency and responsively providing a number of credits which may be played by the player.

27. A game system, as set forth in claim 20, the player game device having a user interface device for allowing interaction between the player game device and game controller and the player.

28. A game system, as set forth in claim 27, the user interface device including a touch-screen display.

29. A game system, as set forth in claim 20, the player game device including a ticket printer for printing a redeemable ticket for any remaining credits on the player game device.

30. A game system, as set forth in claim 20, the player game device including a bill validator, a user interface device, a ticket printer all coupled to and controller by a device controller.

31. A game system, as set forth in claim 20, wherein the game controller establishes the set of randomly determined numbers over a predetermined time period.

32. A game system, as set forth in claim 20, wherein the first pay table is established as a function of the number of numbers selected by the player.

33. A game system, as set forth in claim 20, wherein the game controller, during the simulated keno game, selects a plurality of balls, each ball having an associated number, the numbers associated with the plurality of balls chosen to achieve the payout conforming to the outcome of the electronic bingo game.

34. A game system, as set forth in claim 33, wherein the selected simulation pay table of the simulated keno game has a plurality of possible payouts, each payout associated with a possible outcome of the electronic bingo game.

35. A game system, as set forth in claim 34, wherein a first payout of the selected simulation pay table of the simulated keno game is a loss of the player and corresponds to zero matches between the numbers chosen by the player and the balls selected by the game controller.

36. A game system, as set forth in claim 34, wherein each simulation pay table of the simulated keno game has an associated number of matches between the numbers selected by the player and the numbers associated with the balls selected by the game controller.

37. A method for playing an electronic bingo game, including the steps of:

allowing a player to place a wager and purchase an electronic bingo card, the electronic bingo card have a grid containing a set of numbers and an associated winning pattern;

establishing a set of randomly chosen numbers;

comparing the set of randomly chosen numbers with the associated winning pattern and establishing an outcome of the electronic bingo game, the outcome of the electronic bingo game including a payout according to a first pay table if the winning pattern has been achieved; and, simulating an electronic keno game by allowing the player to choose how many numbers are to be played in the simulated keno game and allowing the player to select the chosen number of numbers;

selecting a simulation pay table for the simulated keno game from a set of pay tables as a function of the player chosen number of numbers and the outcome of the electronic bingo game;

selecting a set of keno winning numbers such that the selected simulation pay table of the simulated keno game establishes a simulated payout as a function of a number of matches between the keno winning numbers and the numbers selected by the player, the simulated payout of the keno game being equivalent to the payout of the electronic bingo game.

38. A method, as set forth in claim 37, including the step of allowing a plurality of players to compete with and against each other in the electronic bingo game.

39. A method, as set forth in claim 37, wherein the associated winning pattern is a game ending pattern, the payout under the first pay table being awarded only to the first player whose electronic bingo card has the game ending pattern.

40. A method, as set forth in claim 37, wherein the set of randomly chosen numbers includes a predetermined number of numbers.

41. A method, as set forth in claim 37, including at least one interim pattern, the at least one interim pattern resulting in a payout according to a second pay table.

42. A method, as set forth in claim 37, wherein the set of randomly determined numbers are established over a predetermined time period.

43. A method, as set forth in claim 37, wherein the selected simulation pay table of the simulated keno game is established as a function of the number of numbers selected by the player.

44. A method, as set forth in claim 37, wherein the game controller, during the simulated keno game, selects a plurality of balls, each ball having an associated number, the numbers associated with the plurality of balls chosen to achieve the payout conforming to the outcome of the electronic bingo game.

45. A method, as set forth in claim 44, wherein the selected simulation pay table of the simulated keno game has a plurality of possible payouts, each payout associated with a possible outcome of the electronic bingo game.

46. A method, as set forth in claim 44, wherein a first payout of the selected simulation pay table of the simulated keno game is a loss of the player and corresponds to zero matches between the numbers chosen by the player and the numbers associated with the balls selected by the game controller.

47. A method, as set forth in claim 44, wherein each simulation pay table of the simulated keno game has an associated number of matches between the numbers selected by the player and the numbers associated with the balls selected by the game controller.

* * * * *

UNITED STATES PATENT AND TRADEMARK OFFICE

CERTIFICATE OF CORRECTION

PATENT NO. : 7,892,084 B2
APPLICATION NO. : 10/938489
DATED : February 22, 2011
INVENTOR(S) : Jon Yarbrough It is certified that error appears in the above-identified patent and that said Letters Patent is hereby corrected as shown below:

Column 8, Line 49:

Please delete “electronic bingo game” and replace with -- electronic game --.

Column 9, Line 10:

Please delete “the keno game” and replace with -- a keno game --.

Signed and Sealed this
Thirty-first Day of May, 2011

David J. Kappos

David J. Kappos
*Director of the United States Patent and Trademark Office*